US012497031B2

(12) United States Patent
Clawson et al.

(10) Patent No.: US 12,497,031 B2
(45) Date of Patent: Dec. 16, 2025

(54) TRACKER TRAJECTORY VALIDATION

(71) Applicant: Zoox, Inc., Foster City, CA (US)

(72) Inventors: Taylor Scott Clawson, Foster City, CA (US); Brian Michael Filarsky, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 202 days.

(21) Appl. No.: 18/087,474

(22) Filed: Dec. 22, 2022

(65) Prior Publication Data

US 2024/0208489 A1 Jun. 27, 2024

(51) Int. Cl.
| | |
|---|---|
| *B60W 30/09* | (2012.01) |
| *B60W 30/095* | (2012.01) |
| *B60W 50/00* | (2006.01) |
| *B60W 50/02* | (2012.01) |
| *B60W 60/00* | (2020.01) |

(52) U.S. Cl.
CPC ........ *B60W 30/09* (2013.01); *B60W 30/0956* (2013.01); *B60W 50/0097* (2013.01); *B60W 50/0205* (2013.01); *B60W 60/0011* (2020.02); *B60W 60/00274* (2020.02); *B60W 2050/0031* (2013.01); *B60W 2556/20* (2020.02); *B60W 2556/45* (2020.02)

(58) Field of Classification Search
CPC ............. B60W 30/09; B60W 60/0011; B60W 60/00274; B60W 30/0956; B60W 50/0097; B60W 50/0205; B60W 2556/20; B60W 2556/45; B60W 2050/0031
See application file for complete search history.

(56) References Cited

U.S. PATENT DOCUMENTS

| | | | | |
|---|---|---|---|---|
| 4,939,650 | A * | 7/1990 | Nishikawa | G05D 1/0272 180/167 |
| 2013/0173115 | A1 | 7/2013 | Gunia et al. | |
| 2016/0001775 | A1* | 1/2016 | Wilhelm | B60W 30/085 701/25 |
| 2020/0114959 | A1 | 4/2020 | Varga et al. | |
| 2020/0341476 | A1* | 10/2020 | Wuthishuwong | G08G 1/167 |
| 2020/0409378 | A1* | 12/2020 | Benisch | G05D 1/0221 |

FOREIGN PATENT DOCUMENTS

EP 0346537 A1 12/1989

OTHER PUBLICATIONS

International Search Report and Written Opinion dated Apr. 16, 2024 for International PCT Application No. PCT/US2023/083346.

\* cited by examiner

*Primary Examiner* — Navid Z. Mehdizadeh
*Assistant Examiner* — Oliver Tan
(74) *Attorney, Agent, or Firm* — EIP US LLP

(57) ABSTRACT

Collision avoidance and error determination for a component of an autonomous vehicle comprising receiving a first trajectory, such as to return a vehicle to an intended trajectory, that a vehicle is predicted to follow, based on an offset between the vehicle and a second trajectory associated with the vehicle, such as a reference trajectory. The first trajectory predicts a first movement characteristic (e.g., a position) of the vehicle at a point in time. A second movement characteristic is received, representing an actual movement characteristic of the vehicle at that point in time. A first error between the first and second movement characteristics is determined. Based at least in part on the first error, performance of a model for generating trajectories that a vehicle is predicted to follow is validated.

20 Claims, 7 Drawing Sheets

TRACKER TRAJECTORY VALIDATION

BACKGROUND

Certain systems, such as autonomous vehicles may include computing systems utilized to generate trajectories and control the vehicles based on the trajectories, as well as error and status data associated with the vehicles. For example, a vehicle trajectory generated by a vehicle computing system may indicate desired states of the vehicle and/or controls to issue to the vehicle at discrete locations and/or times. The vehicle computing system may perform collision checking based on the vehicle trajectory. However, differences between vehicle locations utilized for generation of the trajectories and actual vehicle locations may result in inaccuracies in the collision checking which may, in certain situations, result in unsafe operation of the vehicle.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
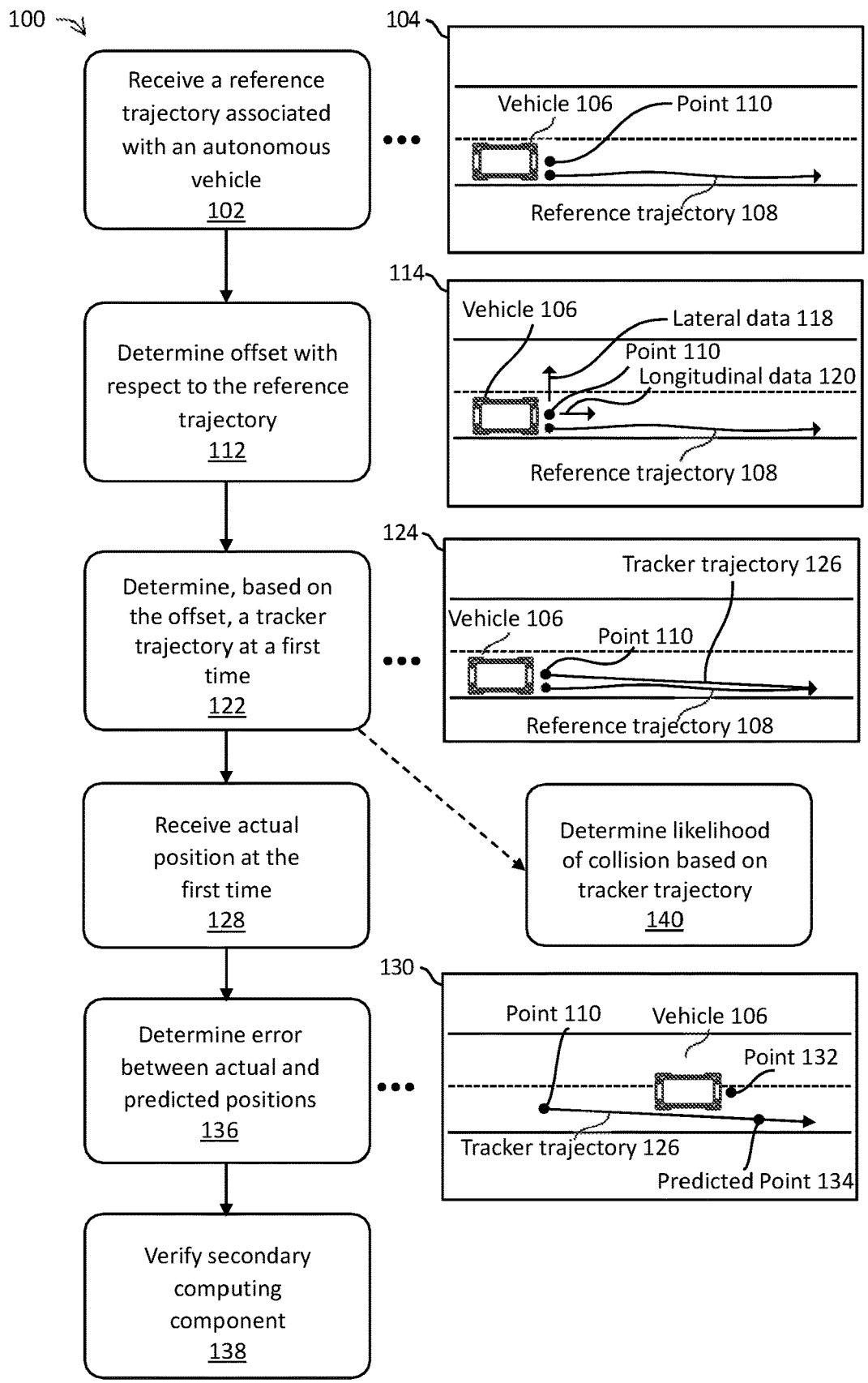
FIG. 1 is a pictorial flow diagram of an example process for verifying a secondary computing component that generated a tracker trajectory, in accordance with examples of the disclosure.

Techniques of the present disclosure relate to methods and systems that estimate vehicle divergences from commanded controls such that, for example, the vehicle may implement one or more safety measures. In various examples, such estimates may be based at least in part on a predicted path or trajectory for the vehicle to follow to return to a desired or reference trajectory. In such examples, the predicted path may be used for collision checking. For instance, the predicted path may be used to identify potential collisions that a collision check based on the reference trajectory alone may miss. As a non-limiting example of which, a vehicle may be somewhat offset from a desired or estimated position along a reference trajectory. Techniques of the present disclosure may verify methods and systems for generating such a predicted path. For example, a first, or tracker, trajectory may be generated by a secondary computing device of the vehicle. The first trajectory may be generated based on an offset between the vehicle and a second trajectory (or reference trajectory) and determined to cause the vehicle to move from the offset location to a location along a reference, or second, trajectory. The second or reference trajectory may be generated by a primary computing device of the vehicle. The first/tracker trajectory may be used to validate the second/reference trajectory, for example based on checking for a potential collision. The first/tracker trajectory may be generated at a first time and may predict the location (and/or other movement characteristic of the vehicle) at a later second time. When the second time is reached, the vehicle may or may not be at the predicted location, for example depending on the accuracy of the model predicting the first/tracker trajectory. Techniques of the present disclosure may determine an error between an actual location (or other movement characteristic) at the second time and the location at the second time predicted by the first/tracker trajectory. The error may be used to verify that the model generating the first/tracker trajectory is accurate. For instance, if the error is large, it may be identified that the model is inaccurate, or not functioning correctly, at least in particular driving scenarios. The model may then be updated to improve functionality. In some examples, a notification may be issued to an engineer based on the verification, for example indicating that there is a problem with the model. Techniques of the present disclosure may provide for safer operation of an autonomous vehicle by verifying that a collision checking system is accurately predicting collisions. Techniques of the present disclosure may also provide an automated mechanism for alerting an engineer to issues in a collision checking system, for example automatically identifying decreases in performance after updates to the model, or updates to other systems of the vehicle.

In some cases, a vehicle (e.g., an autonomous vehicle) travelling through an environment can include a vehicle computing system utilized to perform trajectory generation. The vehicle computing system can include a primary computing device with a planning component to generate trajectories associated with the vehicle. The trajectories can be generated to enable the vehicle to be safely and legally controlled, while avoiding any possible interactions (e.g., collisions or near-miss collisions) with objects in the environment. The planning component can select or otherwise determine an optimized trajectory based on characteristics associated with the optimized trajectory being more closely aligned with corresponding priorities and/or corresponding preferences than one or more remaining trajectories. The planning component can output the optimized trajectory as the reference trajectory. Additional examples of detecting objects and determining trajectories for vehicles to follow can be found, for example, in U.S. patent application Ser. No. 15/843,512 titled "Trajectory Generation Using Curvature Segments" and filed Dec. 15, 2017, the entirety of which is herein incorporated by reference and for all purposes.

The vehicle computing system can include a secondary computing device with a tracker trajectory component to simulate a trajectory (which may be referred to as a tracker trajectory, an estimated trajectory, a simulated trajectory, a predicted trajectory, and the like) along which the vehicle is expected to travel, based on offsets from the reference trajectory. In at least some examples, such a tracker trajectory may not be simulated, but generated based at least in part on an optimized set of controls to return the vehicle from an offset location (either in position, heading, etc.) to a desired point along the reference trajectory, including any potential kinematic and/or dynamic constraints. The tracker trajectory component can simulate the trajectory that the vehicle is expected to follow based on the reference trajectory and based on an offset between the vehicle when the reference trajectory is generated and a point associated with the reference trajectory. The offset utilized to generate the predicted trajectory can include, for example, a lateral offset, a longitudinal offset, a heading offset, and the like. The simulated trajectory, which can be identified as a predicted trajectory associated with the vehicle, can be generated based on the offset and a vehicle motion model (e.g., a kinematics model and/or dynamics model).

The vehicle computing system can include a collision checking component utilized to perform collision checking based on the tracker trajectory. The collision checking component can perform the collision checking by generating a vehicle bounding box associated with the vehicle, and an object bounding box associated with an object in the environment. The vehicle bounding box can be propagated along the tracker trajectory and can be utilized to determine a likelihood of collision associated with the object, based on the object bounding box being propagated along an object trajectory of the object. The likelihood of collision can be determined for the tracker trajectory point, which may be identified by the tracker trajectory component based on the offset. The collision checking component can utilize the tracker trajectory to validate the reference trajectory as a validated reference trajectory, and output, as a control trajectory, the validated reference trajectory based on determining there is no likelihood of collision associated with the tracker trajectory. In some examples, the collision checking component can output, as the control trajectory, an alternate trajectory, such as a safe stop trajectory, based on determining there is a likelihood of collision associated with the tracker trajectory. The control trajectory can be utilized by a tracker component to control the vehicle. Additional techniques for generating a first/tracker trajectory, and for providing collision checking based on the trajectory are discussed in U.S. patent application Ser. No. 17/875,700 titled "Reference Trajectory Validating and Collision Checking Management" and filed Jul. 28, 2022, which incorporated herein by reference in its entirety for all purposes.

The reliability of the collision checking provided by the collision checking component may depend on the accuracy of the path predicted by the tracker trajectory. For example, the tracker trajectory may comprise predicted locations of the vehicle at future time points as the vehicle converges with the reference trajectory. A tracker trajectory generated at a first time may predict a position of the vehicle at a later second time. The vehicle may then drive a path, for example, to converge with the reference trajectory. The actual path driven by vehicle may not match that predicted by the tracker trajectory generated at the earlier, first, time. In particular, the actual position of the vehicle at the second time may be different to the predicted position at the second time in the tracker trajectory. The collision checking provided by the secondary computing device may be more accurate the closer the match between the actual path taken by the vehicle and the path predicted in the tracker trajectory, for example, by using additional data over longer periods of time, using additional computational resources in a remote computing device, etc. Thus, analyzing the difference between the tracker trajectory and the actual path travelled may allow the accuracy of the tracker trajectory to be verified, and potential inaccuracies to be highlighted and improved. Such verification may be performed for multiple different tracker trajectories, allowing metrics to be generated describing performance of a model generating the tracker trajectory (e.g. as implemented by the secondary computing device). The metrics may indicate that performance of the model is below an expected value or has otherwise decreased relative to a previous build of the model. The metrics may indicate that there are particular driving scenarios where a generally accurate model does not perform well, highlighting inaccuracies that may otherwise be missed. An alert may be issued to an engineer if any problems are detected, allowing the model, and hence the reliability of the collision checking, to be improved. Errors may be periodically generated by one or more vehicles, providing regular and detailed information for verifying performance of the model.

As illustrated by these examples, the techniques described herein can improve the functioning, safety, and efficiency of vehicles (e.g., driver controlled vehicles with safety systems, semi-autonomous vehicles, autonomous vehicles, robotic platforms, systems, etc.) traversing through environments. In various examples, a first (tracker) trajectory that a vehicle is predicted to follow may be received. The first trajectory may be based at least in part on an offset between the vehicle and a second (reference) trajectory associated with the vehicle. The first trajectory may be generated at a first time and may predict a first characteristic of the vehicle, which may be a movement characteristic such as position, of the vehicle at a second time. A second characteristic (e.g. movement characteristic, such as position) of the vehicle may be received. The second characteristic may represent an actual characteristic of the vehicle at the second time. Examples may determine a first error between the first characteristic and the second characteristic. Examples may verify, based at least in part on the first error, performance of a model for generating trajectories that a vehicle is predicted to follow.

As used herein, a characteristic or a movement characteristic of a vehicle may include a position (e.g. a lateral and/or longitudinal position), velocity, acceleration, orientation, and/or pose of the vehicle. Accordingly, some examples may compare a predicted position, velocity, acceleration, orientation and/or pose of the vehicle at a specified point in time with an actual predicted position, velocity, acceleration, orientation and/or pose of the vehicle at the specified point in time. Some examples may compare a plurality of position, velocity, acceleration, orientation, and/or pose at the specified time. The determined error between the two movement characteristics may represent a position error, such as a lateral position error and/or a longitudinal error. The determined error may alternatively or additionally represent a heading error, a pose error, a velocity error, and/or an acceleration error.

Some examples may determine a difference between a first reference trajectory associated with the tracker trajectory and a second reference trajectory associated with the second time. The first reference trajectory associated with the tracker trajectory may be the reference trajectory on which the tracker trajectory is based. Some examples may determine that the difference between the two reference trajectories is less than or equal to a threshold difference. Such examples may account for variations in the reference trajectory between the first time and the second time. The reference trajectory is the path the vehicle is directed to follow. A change in the reference trajectory may cause the position (or other movement characteristic) of the vehicle to change. If the reference trajectory changes after generation of the tracker trajectory, the positions of the vehicle predicted in the tracker trajectory may vary, in some cases substantially, from the actual position of the vehicle at the second time. For example, the primary computing component of the vehicle may decide to change the lane the vehicle is travelling in. A tracker trajectory generated when the vehicle was in the initial lane may predict future positions in that same initial lane. If the reference trajectory actually changes to move the vehicle into a new lane, the actual position of the vehicle may be in the new lane at the second time. Such a difference between the predicted and actual position of the vehicle may appear as though the tracker trajectory is inaccurate. Accordingly, some examples check for changes in the reference trajectory between the first and second times. If the difference between the reference trajectory at the first time and the reference trajectory at the second time is less than a predetermined threshold, the tracker trajectory may be used to determine the error and metrics discussed above. However, if the difference in reference trajectories exceeds the predetermined threshold, some examples may not generate an error for that tracker trajectory, and/or may not use that tracker trajectory to determine metrics based on multiple tracker trajectories. Such examples may prevent a change in reference trajectory from being misinterpreted as inaccuracies in the tracker trajectory model. In some examples, determining a difference between the first and second reference trajectories may comprise determining a difference between an intended position of the vehicle at a comparison time in the first reference trajectory and an intended position of the vehicle at the comparison time in the second reference trajectory (e.g., a Euclidian distance, a difference in any variable associated with a state of the vehicle, etc.). The comparison time may be the second time (as used above for comparing the tracker trajectory to the actual position), or any other time before or after the second time. In at least some examples, the metric may be informed by the difference. As non-limiting examples of which, the metric may be scaled or weighted based at least in part on the difference.

Some examples may generate a first metric based at least in part on the first error between the first movement characteristic and the second movement characteristic. The first metric may be descriptive of performance of the model for generating trajectories that a vehicle is predicted to follow (e.g., the model that generated the first/tracker trajectory used for calculating the error). In such examples, verifying the model may be based at least in part on the generated metric.

Some examples may determine errors based on multiple tracker trajectories. For example, some examples may receive a third (tracker) trajectory that the vehicle is predicted to follow. The third trajectory may be generated at a third time and may predict a third movement characteristic of the vehicle at a fourth time. The third trajectory may be generated based on an offset between the vehicle and a reference trajectory of the vehicle at or associated with the third time. A fourth movement characteristic of the vehicle may be received which may represent an actual movement characteristic of the vehicle at the fourth time. A second error between the third movement characteristic and the fourth movement characteristic may be determined. Further errors may be similarly generated for any number of further tracker trajectories. In determining an aggregate performance, such errors may be combined including, as examples, an average (including a weighted and/or moving average), or otherwise. Additionally or alternatively, multiple errors may be determined for a single tracker trajectory. A tracker trajectory may predict positions (or generally movement characteristics) of the vehicle at multiple times. For example, the tracker trajectory may predict a first position at a first time, and a second position at a second time. A first error may be calculated based on the difference between the first position and the actual position of the vehicle at the first time. A second error may be calculated based on the difference between the second position and the actual position of the vehicle at the second time. Any further number of errors may be generated from the same tracker trajectory. Further, plural errors may be generated for each of plural tracker trajectories. Such examples may allow the accuracy of the tracker trajectory to be analyzed as a function of time after generation of the tracker trajectory. For example, techniques may verify accuracy of the model for predicting very short times into the future, and separately accuracy of the model for predicting (relatively) longer times into the future. Looking at multiple prediction times may allow techniques to identify more information to help with improving the model for generating tracker trajectories. For example, techniques may identify a decrease in accuracy of the prediction when predicting longer times into the future (e.g., three seconds or four seconds into the future), optionally for a particular driving scenario. An alert may be issued to an engineer, providing details of the inaccuracy, the driving scenario it relates to, and the variation in accuracy over prediction time. Such details may facilitate improvement of the model, leading to improved reliability of the collision checking provided based on the tracker trajectory.

In some examples, the metric may be or comprise an average, such as a mean, of multiple errors generated as above. The metric may be or comprise a measure of spread, such as a standard deviation, of multiple errors. A metric may be determined based on a comparison of multiple errors. For example, the metric may represent a tracker trajectory (or trajectories) that has the largest error with respect to a group of errors. Such a metric may represent the 'worst case' error, and may be used to identify driving scenarios which the model performs worst against. Multiple errors may be grouped based on a shared prediction time. A prediction time may represent the difference between the first time (at which a respective tracker trajectory was generated) and the second time (for which the actual movement characteristic is compared to determine a respective error). For example, errors may be grouped into respective bins. Each bin may represent a respective prediction time, or a range of prediction times. One or more metrics may be generated based on errors within a first bin. Respective metrics may be generated for a plurality of the bins, or all of the bins.

In some examples, a geographic location associated with the error may be determined for the/each tracker trajectory. This may allow particular locations in an environment associated with low model performance to be identified. For example, verifying performance of the model may comprise identifying a location for which multiple tracker trajectories have a high error, such as an error equal to or greater than an error threshold. The location may be a geographic location, such as a particular position in a map. The location may be a location type, for example representing a type of feature in the environment such as a junction, particular type of junction, road layout, etc. Thus examples may identify locations or types of features against which the model performs badly.

In some examples, a tracker trajectory or error may be identified (e.g., retrieved from a memory and/or transmitted to a remote system) based at least in part on a difference between the first time and the second time for that first trajectory, i.e., based at least in part on the prediction time of that error. For example, it may be desired to analyze errors for positions four seconds after generation of the tracker trajectory. The second time may be selected (which may be the current time, when such a process is implemented on the vehicle itself). A tracker trajectory may then be identified which was generated (approximately) four seconds prior to that second time. For example, a tracker trajectory that was generated closest to four seconds prior to the second time may be identified. An error may then be generated from the identified tracker trajectory for the selected second time, as discussed above.

In some examples, verifying the model may comprise comparing one or more metrics to respective thresholds. For example, a first metric descriptive of performance of the model may be compared to a first threshold. A threshold may be a predetermined threshold, for example a threshold representing an expected performance of the model. A threshold may be, or may be associated with, a previously generated metric such as a metric generated from a previous iteration of the model. Such a threshold may be used to verify that a change to the model (or other systems of the vehicle) has improved, or at least not decreased, accuracy of the generated tracker trajectories. For example, an autonomous vehicle may comprise many systems. A change in one system may not be apparent to another system but may still impact performance of that other system. Techniques of the present disclosure may automatically verify that accuracy of the tracker trajectory model has not been impacted by (unknown) changes in other systems of the vehicle. As such, techniques of the present disclosure may be particularly useful for ensuring reliability of the collision checking system even as vehicle systems are iteratively updated. A threshold may be applied to a metric generated for errors associated with a particular prediction time. Different thresholds may be used for metrics associated with different prediction times. For example, a first metric for errors associated with a first prediction time may be compared to a first threshold. A second metric for errors associated with a second prediction time may be compared to a second threshold. In some examples, it may be expected that accuracy of a tracker trajectory decreases over time. Accordingly, in some examples a metric associated with later prediction times may be compared to a higher threshold than a metric associated with earlier prediction times (where a larger metric value represents worse performance). Such techniques may reduce the number of false alerts related to generally less accurate later prediction times, without compromising on sensitivity to inaccuracies at early prediction times.

Some examples may issue an alert to a user, for example an engineer. An alert may be issued based at least in part on verifying the model for generating the tracker trajectories. For example, if it is identified that the model is not performing as expected, a user may be alerted. An alert may be issued based on comparing a metric to a threshold. For example, if a larger value of the metric indicates worse performance, an alert may be issued if the threshold is exceeded. In other examples an alert may be issued if a metric is less than a threshold. An alert may be issued based on a metric associated with a particular prediction time or group of prediction times. An alert may provide details of one or more tracker trajectories and/or information on the driving scenarios experienced by the vehicle generating the tracker trajectory. For example, where a metric relates to the largest error from a group of errors, i.e., the 'worst case', the alert may provide details relating the vehicle and the environment the vehicle was travelling through between the first time and second time for the respective 'worst case' tracker trajectory. Issuing an alert may comprise transmitting a communication, such as a message or email to a user. Issuing an alert may comprise displaying an information on a display, such as a display of a user interface. Issuing an alert may comprise issuing any other notification intended to inform a user of the identified problem. In some examples, information relating to verification of the model may be output, for example upon receiving a request from a user, and/or based on a schedule. For example, one or more metrics, or results of comparisons of metrics with respective thresholds, may be generated and output once a week, providing information on performance of the model in one or more vehicles of a fleet of vehicles during the preceding week. In at least some examples, such alerts may be used to automatically prevent a newer version from being released to a vehicle of a fleet of vehicles and/or to replace an existing version with a previous version having known and validated performance.

Techniques of the present disclosure may be performed entirely onboard the vehicle. For example, one or more computing systems of the vehicle may perform the techniques. In some examples, techniques may be performed partially on the vehicle, and partially at a remote computing system. For example, a vehicle (or computing system thereof) may periodically generate errors for one or more prediction times. When a predetermined time is reached, an actual position of the vehicle may be determined. One or more tracker trajectories may be retrieved corresponding to the desired one or more prediction times. Respective errors may then be determined for each of the one or more prediction times based on difference between the actual position at that current time, and the predicted position for that time in the respective tracker trajectories. In some examples the determined errors may be transmitted to the remote computer system. In some examples determined errors may be stored on the vehicle and transmitted to the remote computer system in batches. In other examples, actual positions (or other movement characteristics) of the vehicle and corresponding tracker trajectories may be transmitted to a remote computer system. The remote computer system may then determine the error from the transmitted data. In other examples, techniques of the present disclosure may be performed entirely on a computer system remote from the vehicle. For example, tracker trajectories and corresponding actual movement characteristics may be stored in a memory associated with the computer system. The computer system may retrieve tracker trajectories and corresponding actual movement characteristics from the memory to determine one or more errors and verify the model. The tracker trajectories may relate to different vehicles, for example where the same model for generating tracker trajectories is employed on multiple different vehicles. In some examples, such techniques may be performed entirely on simulated vehicles operating in a simulated environment (e.g., receiving simulated sensor data, determining the respective trajectories, and controlling the simulated vehicle to move through the simulated environment).

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another examples, the techniques can be utilized in an aviation or nautical context, or in any system configure to input data to determine movement associated with objects in an environment. Additionally, the techniques described herein can be used with real data (e.g., captured using sensor(s)), simulated data (e.g., generated by a simulator), or any combination of the two.

Figure 4:
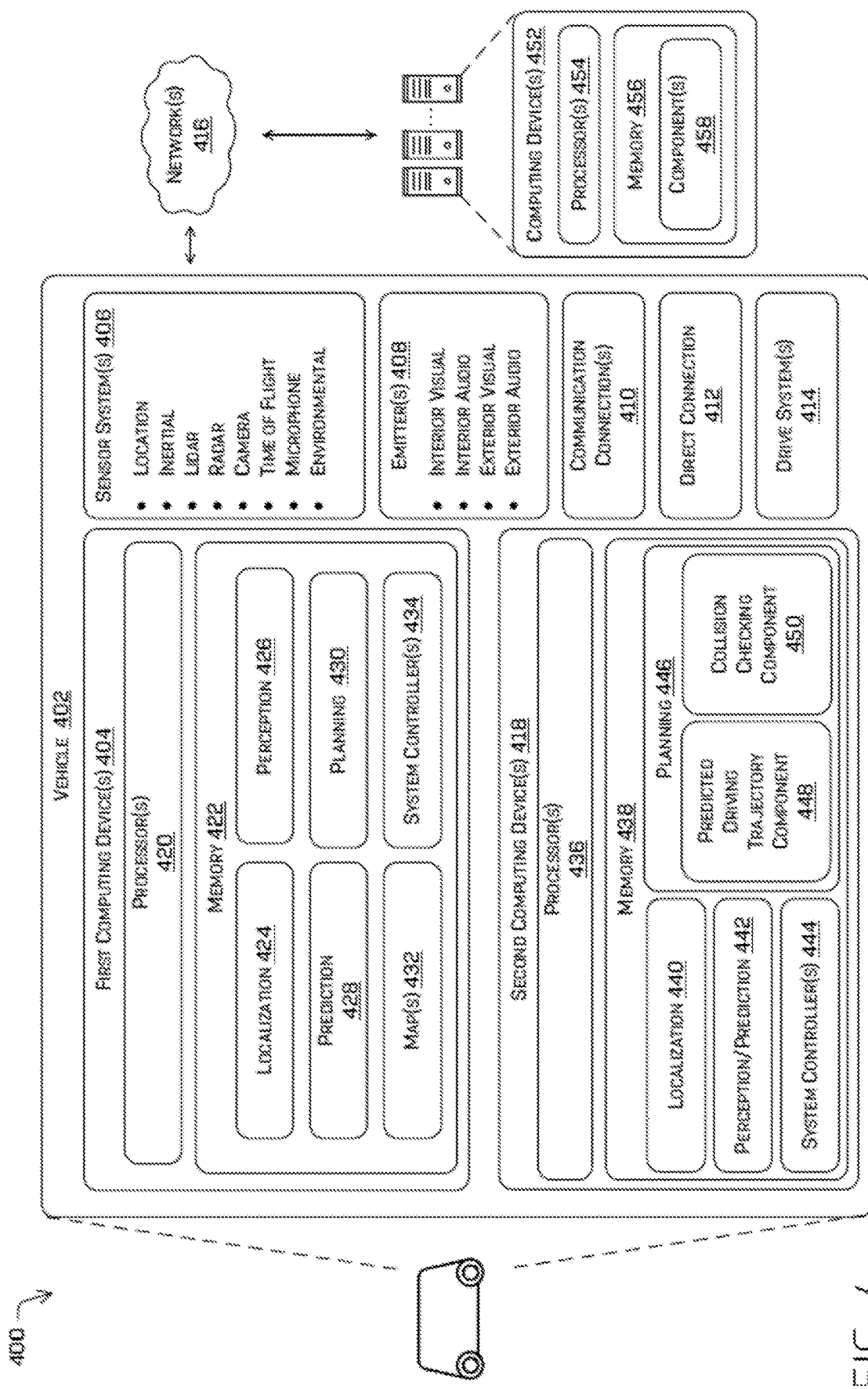
FIG. 4 depicts is a block diagram of an example system for implementing the techniques described herein.

FIG. 1 is a pictorial flow diagram of an example process 100 for verifying a secondary computing component/model for generating tracker trajectories, in accordance with examples of the disclosure. In examples, one or more operations of the process 100 may be implemented by a vehicle computing system, such as by using one or more of the components and systems illustrated in FIG. 4 and described below. For example, one or more components and systems can include the first computing device(s) 404 and the second computing device(s) 418 illustrated in FIG. 4. In examples, the one or more operations of the process 100 may be performed by a remote system in communication with a vehicle, such as the computing device(s) 452 illustrated in FIG. 4. In still other examples, the one or more operations of the process 100 may be performed by a combination of a remote system and vehicle computing systems. However, the process 100 is not limited to being performed by such components and systems, and the components and systems of FIG. 4 are not limited to performing the process 100.

An operation 102 can include receiving a reference trajectory associated with a vehicle (e.g., an autonomous vehicle). Receiving the reference trajectory can include receiving, by a secondary computing device (or secondary computing component), an optimized trajectory that an autonomous vehicle is controlled to drive (or follow). In some examples, the reference trajectory can include steering and/or acceleration data, location and associated time points where the vehicle is expected to be, and the like.

The reference, or optimized, trajectory can be received from a primary computing device (or primary computing component), based on multiple candidate trajectories generated by the primary computing device. The candidate trajectories may be determined based on detection of objects in the environment in which the vehicle is traveling and, in some examples, predicted trajectories of moving objects in the environment. The candidate trajectories generated by the primary computing device can be utilized by the primary computing device to select the optimized trajectory from among the candidate trajectories. The optimized trajectory can be transmitted, as the reference trajectory, by the primary computing device and received by the secondary computing device. Such an optimized trajectory may comprise a nominal trajectory for traversing an environment as determined in accordance with various systems such as, for example, as described in U.S. Pat. No. 11,048,260 entitled "Adaptive Scaling in Trajectory Generation", the entire contents of which are hereby incorporated by reference.

The objects and the predicted object trajectories can be determined by the primary computing device based on sensor data associated with the environment. The sensor data, such as image data, radar data, lidar data, etc., can be received by the primary computing device and from sensors utilized to capture the sensor data. In some examples, such sensors may be local to the vehicle or remote from the vehicle. The sensor data may be associated with and may identify various objects within the environment. The objects encountered within an environment can include dynamic objects that are moving or capable of movement (e.g., vehicles, motorcycles, bicycles, pedestrians, animals, etc.), and/or static objects (e.g., buildings, road surfaces, trees, signs, barriers, parked vehicles, etc.). The primary computing device can determine information about the objects detected in the environment. The object information can include bounding boxes, object segmentation information, classification information, etc.

An initial position of the vehicle can be utilized to determine a location (e.g., a point) associated with the vehicle. The initial position may represent the position of the vehicle at a first time. The initial position, which can be identified as the point, can be determined based on various types of information associated with the vehicle. In some examples, the point can be received by the secondary computing system and from the primary computing device. The point can be associated with the reference trajectory 108, as discussed below.

An example 104 illustrates a vehicle 106 that may be located in an environment. The vehicle 106 may be configured with and/or in communication with a vehicle computing system, including the primary computing device and the secondary computing device. The primary computing device of the vehicle 106 can receive and/or determine a trajectory (e.g., a reference trajectory) 108 to be utilized, for example, to navigate the vehicle 106 through the environment.

An initial position of the vehicle 106 can be utilized to determine a location (or a current position) (e.g., a point) 110 associated with the vehicle 106. The initial position, which can be identified as the point, can be determined based on location data (e.g., a geographic location), orientation data (e.g., a pose, a tilt, etc.), movement data (e.g., a velocity, an acceleration, etc.), and various other data types associated with the vehicle (e.g., an output of a localization system, subsystem, or component). The point 110 can be associated with at least one of a vehicle point (e.g., a center point of a front bumper), a metric (e.g., a predetermined distance, such as a predetermined longitudinal distance, from the vehicle point), and/or any other types of characteristics and/or metrics. In some examples, the point 110 can be a point at a center of the vehicle 106, with the point 110 being at same lateral distances from both sides of the vehicle 106 and same longitudinal distances from both ends of the vehicle 106. The point 110, which can be associated with, and/or determined based on, a current trajectory, such as the reference trajectory 108, can be received from the primary computing device. In some examples, the vehicle 106 (and the point 110) may not be located exactly on the reference trajectory 108 because of errors (e.g., associated with the sensors, associated with the components and subcomponents for determining position, associated with the controllers/actuators, etc.), vehicle drift or slip, etc., caused by real-word obstacles or conditions such as ice, snow, rain, potholes, tire slip, differences in frequencies of operation (e.g., between determining location and actuating the vehicle), and the like.

An operation 112 can include determining an offset with respect to the reference trajectory. For example, a lateral, longitudinal, heading, etc. offset may be determined. The offset may be determined with respect to the point 110. The offset can be determined based on, respectively, determining a distance between an actual location of the vehicle 106 (or a predicted location of the vehicle 106) and a corresponding point on the reference trajectory 108.

In some examples, the offset can be determined based on errors associated with a predicted location of the vehicle 106. As a non-limiting example, the lateral offset can be determined based on a lateral error, including one or more lateral errors associated with a yaw and/or or a heading of the vehicle 106. By way of example, the lateral offset can include or otherwise be associated with a yaw offset and/or a heading offset. The lateral error(s) can be determined based on one or more differences between a yaw (e.g., an intended yaw) and/or a heading (e.g., an intended heading) associated with the reference trajectory 108 and, respectively, a current yaw and/or a current heading of the vehicle 106. The longitudinal offset can be determined based on a longitudinal error, including one or more longitudinal errors associated with a velocity and/or an acceleration of the vehicle 106. The longitudinal error(s) can be determined based on one or more differences between a velocity (e.g., an intended velocity) and/or an acceleration (e.g., an intended acceleration) associated with the reference trajectory 108 and, respectively, a current velocity and/or a current acceleration of the vehicle 106. The lateral offset and the longitudinal offset can be determined by the secondary computing component. The lateral offset and the longitudinal offset can be determined with respect to the point 110 at the initial start position.

Vehicle tracker data can be identified and/or generated by the vehicle 106. The vehicle tracker data can be generated by the secondary computing device of the vehicle 106. The vehicle tracker data can include lateral data 118 and longitudinal data 120. The offset data may indicate a distance from the reference trajectory and may include lateral offset data (or lateral data) 118 (e.g., a lateral offset at the first time) and longitudinal offset data (or longitudinal data) 120 (e.g., a longitudinal offset at the first time). The lateral data 118 and the longitudinal data 120 can be identified with respect to the point 110.

An operation 122 can include determining based on the offset (e.g., the lateral offset and/or the longitudinal offset), a tracker trajectory. In some examples, expected lateral offset data and/or expected longitudinal offset data can be determined for several portions of the reference trajectory and can be used to generate the tracker trajectory. The tracker trajectory, which can be associated with the vehicle 106, can be generated by the secondary computing device of the vehicle 106 to return the vehicle to a point along the reference trajectory. The tracker trajectory can be associated with the first time, i.e., the time corresponding to the point 110. The first time may represent a time at which the tracker trajectory is generated. The tracker trajectory can be used to simulate a trajectory along which the vehicle 106 is expected to travel, based the current data of the vehicle 106, calculated commands associated with the tracker, and/or the point 110. The current data can include, for example, the current lateral data and the current longitudinal data, or otherwise. The simulated trajectory, which can be identified as a predicted trajectory associated with the vehicle, can be generated based on the current data and the motion model (e.g., the kinematics and/or dynamics model). The model, which can be iteratively used for a constant time period over a fixed horizon, can be integrated to project (e.g., orthogonally project) the current lateral data and the current longitudinal data onto the reference trajectory, as projected lateral data (e.g., the lateral component of the point) and projected longitudinal data (e.g., the longitudinal component of the point), respectively. By way of example, the model can be utilized, along with a lane-keeping tracker and/or a least squares model, to determine a next location (e.g., a next point) associated with the vehicle 106. The predicted trajectory can be identified as the tracker trajectory that the vehicle 106 is predicted to follow to converge to the reference trajectory 108.

An example 124 illustrates a tracker trajectory 126 associated with the vehicle 106. The tracker trajectory 126 can be generated utilizing the kinematics model, the current data (e.g., the lateral offset and the longitudinal offset) of the vehicle 106, and/or the point 110. The tracker trajectory 126 may predict the position of the vehicle 106 at a number of points in the future (the future relative to a first time at which this particular tracker trajectory 126 is generated). For example the tracker trajectory 126 may predict a position of the vehicle 106 at a second time.

An operation 128 can include receiving an actual position of the vehicle 106 at a second time, later than a first time at which a tracker trajectory is generated. The actual position may be a measured position of the vehicle received from a localization system of the vehicle 106, which may for example be part of a primary computer system or a secondary computer system. The actual position may be or comprise an actual lateral position and/or actual longitudinal position of the vehicle at the second time. In at least some such examples, operation 128 may be performed by a computer remote from the vehicle 106 having additional computational resources, a complete history of the drive with associated data, and the like.

An example 130 illustrates the vehicle 106 at a second time. A position of the vehicle may be defined based on a point 132, similar to point 110 discussed above.

An operation 136 can include determining an error between the actual position of the vehicle 106 at the second time, and the position at the second time predicted by the tracker trajectory generated at the earlier first time. As shown in the example 130, the vehicle 130 may have deviated from the predicted path of the tracker trajectory 126. This deviation may be related to the accuracy of the tracker trajectory 126, or the model/system component generating the tracker trajectory 126. The deviation may be evaluated by determining a difference between an actual position of the vehicle 106 and a predicted position of the vehicle at a second time. In the example 130, the actual position of the vehicle 106 at the second time is represented by the point 132. The predicted position at the second time expected from the tracker trajectory 126 is predicted point 134. In this example there is both a lateral and longitudinal difference between the actual point 132 and predicted point 134. In other words, the vehicle 106 is both offset sideways (orthogonal to direction of travel/road direction) from the expected point 134, and behind (in the direction of travel/road direction) the predicted point 134. In other examples there may only be a lateral or a longitudinal difference. Operation 136 may comprise determining separately a lateral difference and a longitudinal difference between the actual point 132 and predicted point 134. Operation 136 may comprise determining only a lateral difference or a longitudinal difference. Operation 136 may comprise determining an absolute distance between the actual point 132 and predicted point 134. The error determined in operation 136 may be or comprise such differences in position. The error may be determined from such differences, for example based on a combination of differences between actual and predicted behavior of the vehicle 106, such as a combination of differences in position, speed, and/or heading at the second time.

An operation 138 may comprise verifying a secondary computing component of the vehicle which generates tracker trajectories, and/or verifying a model generating tracker trajectories. Verifying the secondary computing component/model may comprise comparing the error (and/or aggregated error) to an expected error, for example representing an expected accuracy of the secondary computing component/model. Verifying the secondary computing component/model may comprise generating a metric based at least in part on the error determined in operation 136. The metric may be generated based on a plurality of errors. The plurality of errors may represent one or more additional prediction times in the same tracker trajectory 126 as discussed above (e.g. comparing actual and predicted position at a third time), an error (or errors) determined from an additional reference trajectory (or trajectories) generated by the same vehicle 106 as discussed above, and/or an error (or errors) determined from an additional reference trajectory (or trajectories) generated by a different vehicle (or vehicles). The metric may be compared to a predetermined threshold, for example represented an expected or desired accuracy of the prediction by the component/model. The metric may be compared to a corresponding metric generated from the component/model at an earlier time. This may allow for continuous or regular monitoring of the component/model, for example to ensure that changes in other systems of the vehicle 106 do not reduce accuracy of the component/model. The metric may be compared to a corresponding metric, for example as generated from a different component/model. For example, the different component/model may be or comprise an earlier version of the component/model, allowing the real-world or simulated performance of updates to the component/model to be verified. By such techniques, the accuracy of the predicted paths generated by the component/model may be evaluated. Where the tracker trajectory is used as part of a collision avoidance system, such techniques may help evaluate safety of the system. By monitoring the error/metric generated by such techniques, safety issues may be highlighted and corrected, improving the safety of the vehicle.

Where used on-vehicle, the method 100 may comprise operation 140 of determining the likelihood of a collision based on the tracker trajectory determined at operation 122. For example, collision checking data may be generated by the second computing device of the vehicle 106 in conjunction with detections and/or predicted motions of detected objects as may be determined by either the primary computer system and/or the secondary computer system. A geometric representation of the vehicle traveling along the tracker trajectory, such as a bounding box, may be propagated along the tracker trajectory 126 and utilized to determine a likelihood of collision associated with an object in the environment. The likelihood of collision associated with the object can be determined based on an object bounding box being propagated along an object trajectory of the object. Additional examples of determining perception information utilized for trajectory selection can be found, for example, in U.S. patent application Ser. No. 17/514,542 titled "Collision Avoidance and Mitigation in Autonomous Vehicles" and filed Oct. 29, 2021, the entirety of which is herein incorporated by reference and for all purposes. Method 100 may further include controlling the vehicle 106. The vehicle 106 can be controlled based on the likelihood of collision associated with the tracker trajectory 126 and the object trajectory of the object in the environment. The likelihood of collision associated with the tracker trajectory 126 and the object trajectory can be utilized to validate the reference trajectory 108, as a validated reference trajectory (or a valid reference trajectory). In some examples, the reference trajectory 108 can be validated as the validated reference trajectory based on determining there is no likelihood of collision associated with the tracker trajectory. The validated reference trajectory can be output as a control trajectory utilized to control the vehicle 106. Additional examples of utilizing status and/or error data identified by safety system components to validate and select trajectories can be found, for example, in U.S. patent application Ser. No. 17/842,469 titled "Vehicle Safety System" and filed Jun. 16, 2022, the entirety of which is herein incorporated by reference and for all purposes. In some examples, the collision checking component can output, as the control trajectory, an alternate trajectory, such as a safe stop trajectory. The safe stop trajectory can be identified from among one or more safe stop trajectories (e.g., one or more of a first safe stop trajectory, a second safe stop trajectory, etc.) having differing longitudinal deceleration profiles. The alternate trajectory can be output as the control trajectory based on determining there is a likelihood of collision associated with the tracker trajectory. The alternate trajectory being output as the control trajectory can be utilized to control the vehicle 106 to reduce the likelihood of collision, and/or to control the vehicle 106 to avoid a potential collision with the object.

In some examples, the method 100 may be performed entirely by onboard systems of a vehicle, such as vehicle 106. In other examples, one or more steps of method 100 may be performed at a remote computing device. For example, a vehicle may perform steps 102, 112, and 122 to generated a tracker trajectory. The vehicle may further measure its actual position at the second time. The vehicle may transmit the tracker trajectory and actual position to the remote system. For example the vehicle may transmit multiple tracker trajectories (generated at different times) and corresponding actual positions in batches to the remote system. The remote system may perform steps 136 and 138 to determine the error and verify the component/model. Alternatively step 136 may be performed by the vehicle, and the determined error may be transmitted to the remote system to perform step 138.

Figure 2:
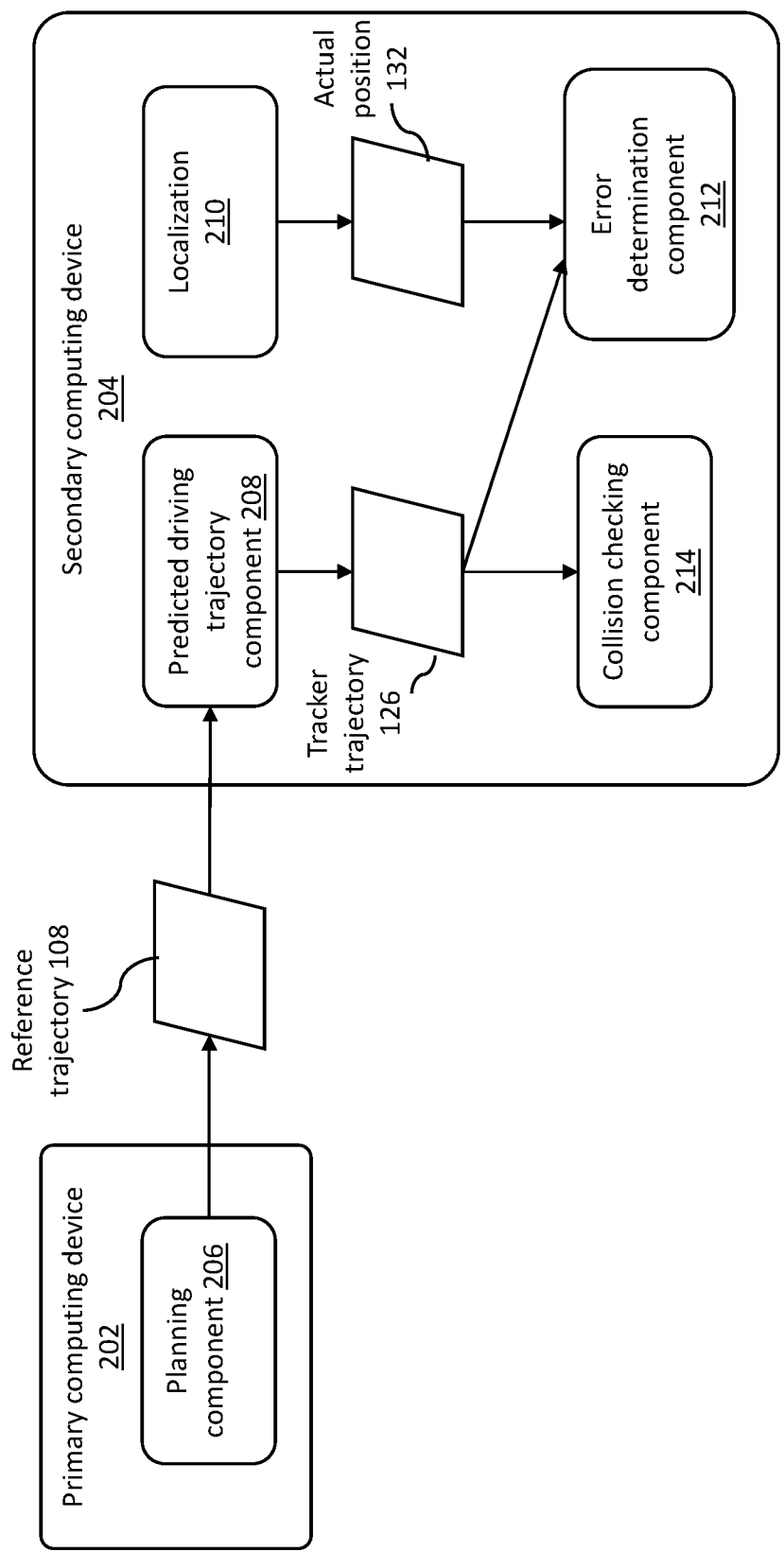
FIG. 2 depicts a block diagram of vehicle system components for implementing the techniques described herein.

FIG. 2 depicts a block diagram of example vehicle system components 200 for implementing the techniques described herein. The vehicle system components 200 can include a primary computing device 202 and a secondary computing device 204. The primary computing device 202 can be utilized to implement the primary computing device of the vehicle 106 as discussed above with reference to FIG. 1. The secondary computing device 204 can be utilized to implement the secondary computing device of the vehicle 106 as discussed above with reference to FIG. 1.

The primary computing device 202 can include a planning component 206. The planning component 206 can be utilized to perform any techniques of the primary computing device as discussed above with reference to FIG. 1. For example, the planning component 206 can be generate multiple candidate trajectories, and generate an optimized trajectory, based on the candidate trajectories. The optimized trajectory can be transmitted, as a reference trajectory (e.g., the reference trajectory 108).

The secondary computing device 204 can include a predicted driving trajectory component (or "simulated driving trajectory component") 208. The secondary computing device 204 can receive the reference trajectory 108. In some examples, the reference trajectory can be received by the secondary computing device 204, via the predicted driving trajectory component 208. The predicted driving trajectory component 208 can generate the tracker trajectory (e.g., the tracker trajectory 126) based on the reference trajectory 108.

The secondary computing device 204 may include a localization component 210. The localization component may comprise one or more sensors, or may receive signals from one or more sensors, for determining a position of the vehicle. The localization component 210 may determine an actual position 132 (e.g. based on point 132) of the vehicle 106 at the second time. An example of a localization component 440 is discussed in more detail below in relation to FIG. 4. In other examples, position of the vehicle may be determined by another system of the vehicle, such as a localization component of the primary computing device 202.

The secondary computing device 204 may comprise an error determination component 212. Error determination component 212 may receive the tracker trajectory 126 generated by the predicted driving trajectory component 208. Error determination component 212 may receive the actual position 132 from the localization component 210.

Error determination component may compare a predicted position of the vehicle as represented in the tracker trajectory 126 to the actual position 132 at point in time (the "second time"). Error determination component may determine a difference between the predicted and actual points, as discussed above in relation to operation 136. An error determined by error determination component 212 may by stored locally, and/or may be transmitted to a remote system, to be used in validating the accuracy of tracker trajectories determined by the predicted driving trajectory component 208.

In some examples the secondary computing device 204 may comprise a collision checking component 214. The collision checking component 214 can perform collision checking utilizing the tracker trajectory 126. The collision checking of the tracker trajectory 126, which can be generated via a kinematics model, can be utilized to validate the reference trajectory 108. The validated reference trajectory 108, or an alternate trajectory, can be output as a command trajectory. By way of example, validated reference trajectory 108 can be output as the command trajectory, or an alternate trajectory (e.g., a first safe stop trajectory, a second safe stop trajectory, etc.) can be output as the command trajectory.

It is to be appreciated that any or all of the planning component 206, predicted driving trajectory component 208, localization component 210, error determination component 212, and/or collision checking component 214 may represent logical blocks rather than separate physical components of the corresponding computing devices 202, 204. For example, any or all of said components may be implemented as software executed on one or more processors of the primary computing device 202 or secondary computing device 204.

FIGS. 3A-3C and 4 illustrate examples processes for verifying a model for generating trajectories, such as a model for generating tracker trajectories in accordance with examples of the disclosure.

Figure 3A:
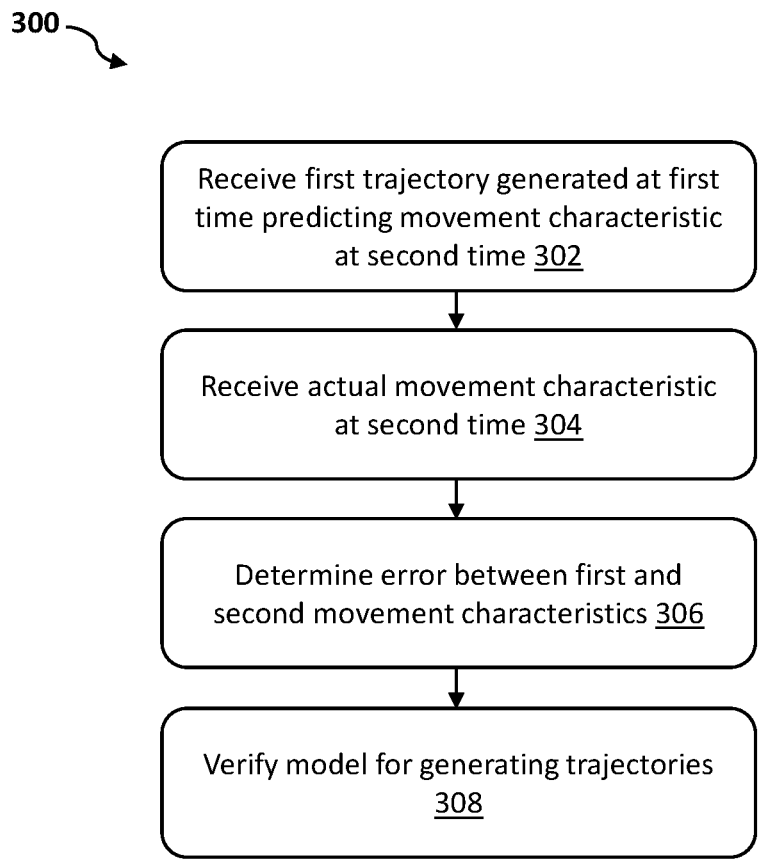
FIGS. 3A-3C depict example processes for verifying a model for generating trajectories.

FIG. 3A illustrates an example method 300. Method 300 may start at operation 302. Operation 302 may comprise receiving a first trajectory that a vehicle is predicted to follow. The first trajectory may be a tracker trajectory. The vehicle may be an autonomous or semi-autonomous vehicle, such as vehicle 106 above. The first trajectory may be based at least in part on an offset between the vehicle and a second trajectory associated with the vehicle. The second trajectory may be a trajectory for the vehicle to follow, such as a reference trajectory. The first trajectory may represent a trajectory the vehicle is predicted to drive to converge with the second trajectory.

The first trajectory may be generated at a first time and may predict a first movement characteristic of the vehicle at a second time. The first movement characteristic may comprise a predicted position, such as a lateral position and/or longitudinal position of the vehicle at the second time. The first movement characteristic may alternatively or additionally comprise a velocity (e.g. lateral and/or longitudinal velocity), acceleration (e.g. lateral and/or longitudinal acceleration), orientation, and/or pose of the vehicle at the second time.

Some examples may comprise identifying the first trajectory based at least in part on a difference between the first time and the second time. For example, it may be desired to analyze accuracy of the prediction in the trajectory at a particular prediction time (also referred to as a lookback time) after generation of the first trajectory. For example, it may be desired to analyze the accuracy of the model for predicting vehicle position 0.1 seconds, 0.2 seconds, 0.5 seconds, 1 second, 2 seconds, and/or 4 seconds into the future. Accordingly, some examples may select an actual position of the vehicle (e.g. representing the current position of the vehicle, where performed onboard the vehicle), and identify a first trajectory based on a desired prediction time. This may comprise retrieving the first trajectory from a memory, such as a memory associated with an onboard system of the vehicle. The first trajectory may be the trajectory generated closest to the desired prediction time before the selected second time. Thus for example, if the desired prediction time is 2 seconds before the current time, and respective trajectories were generated 1.5 seconds ago and 2.2 seconds ago, the trajectory generated 2.2 seconds ago may be identified as the first trajectory. In other examples, a trajectory may be selected, and the corresponding actual position a desired prediction time after generation of that trajectory may be identified.

At operation 304, the method 300 may comprise receiving a second movement characteristic of the vehicle. The second movement characteristic may correspond to the first characteristic, for example comprising the same ones of position, velocity, acceleration etc. The second movement characteristic may represent an actual movement characteristic of the vehicle at the second time. For example, the second movement characteristic may represent an actual position, orientation, velocity, acceleration, etc. of the vehicle at the second time. The second movement characteristic may be generated by a localization component of the vehicle, for example based on one or more sensor measurements, from the primary compute, etc.

At operation 306, method 300 may comprise determining a first error between the first movement characteristic and the second movement characteristic. For example, the first error may be or comprise the difference between the first and second movement characteristics. In examples, the first error may represent a position error (e.g. a lateral position error and/or a longitudinal position error), a heading error, a pose error, a velocity error, and/or an acceleration error.

At operation 308, method 300 may comprise verifying, based at least in part on the first error, performance of a model for generating trajectories that a vehicle is predicted to follow. In some examples, verifying may comprise generating a first metric based at least in part on the first error. The first metric may be descriptive of performance of the model for generating trajectories that a vehicle is predicted to follow. Some examples may comprise comparing the first error and/or first metric to a threshold. For example, the threshold may represent a baseline performance of the model. The threshold may represent a predetermined upper/lower bound for the error. The threshold may represent a previously generated metric, such as a metric based on an earlier iteration of the model, or a metric representing past performance of the model. If the error exceeds the threshold (where a high value of the error/metric represents lower accuracy), it may be determined that the model is not performing adequately. One or more issues with the model may be identified based on a driving scenario associated with the first error. For example, systems of the vehicle may record information relating to the environment experienced by the vehicle between the first time (associated with generation of the first trajectory) and second time. Such information may be associated with the first error, and may be used to identify a driving scenario that causes an inaccuracy in the trajectory predicted by the model. For example, if an error or associated metric exceeds a predetermined threshold, the information relating to the environment may be used to identify a problem driving scenario.

The model may then be updated to improve performance in such driving scenarios. By such techniques, inaccuracies in the model may be identified, which may otherwise have gone unnoticed, allowing the model to be improved.

Some examples may comprise determining multiple errors between predicted and actual positions. In some cases, additional errors may be determined from the first trajectory, for example representing accuracy of the first trajectory at different prediction times after generation of the first trajectory. Additionally or alternatively, in some examples method 300 may comprise receiving a third trajectory that the vehicle is predicted to follow. The third trajectory may be generated at a third time and may predicting a third movement characteristic of the vehicle at a fourth time. Method 300 may comprise receiving a fourth movement characteristic of the vehicle, the fourth movement characteristic representing an actual movement characteristic of the vehicle at the fourth time. Method 300 may comprise determining a second error between the third movement characteristic and the fourth movement characteristic.

In some examples, the first error and second error may represent different prediction times. Accordingly, in some such examples a difference between the first time and the second time may be associated with a first time difference (i.e. a first 'prediction time'). A difference between the third time and the fourth time may be associated with a second time difference (i.e. a second 'prediction time'). The first time difference may be longer than the second time difference. Thus errors may be generated for different prediction times, representing the performance of the model in prediction the position/movement characteristic of the vehicle at different times in the future. Operation 308 may then verify the model based on the errors at different prediction times. For example, separate verification operations may be performed for errors representing different prediction times. This may provide greater insight into how the model is performing. In some examples, respective metrics are generated based on errors at each prediction time. For example, multiple errors may be generated, based on either a single vehicle or a fleet of vehicles. Errors may be grouped based on prediction time (e.g. binned). A metric may be determined for each group of errors, such as a mean and/or deviation. A metric may then be compared to a respective threshold indicative of performance of the model. Metrics representing different prediction times may be compared to different thresholds.

In some examples, a difference between the first time and the second time may be associated with a first time difference. A difference between the third time and the fourth time may be associated with a second time difference. The first time difference may be the same as the second time difference. In other words, in some examples errors may be generated representing the same prediction time (e.g. both may represent predicted position 1 second after generation of the respective trajectories).

In some examples, operation 308 may comprise comparing the first error to the second error (and optionally further errors). One or more examples with the highest errors may be identified. Driving scenarios associated with such examples may be retrieved. Such techniques may highlight driving scenarios where the model performance worst, which may guide improvements in the model.

Figure 3B:
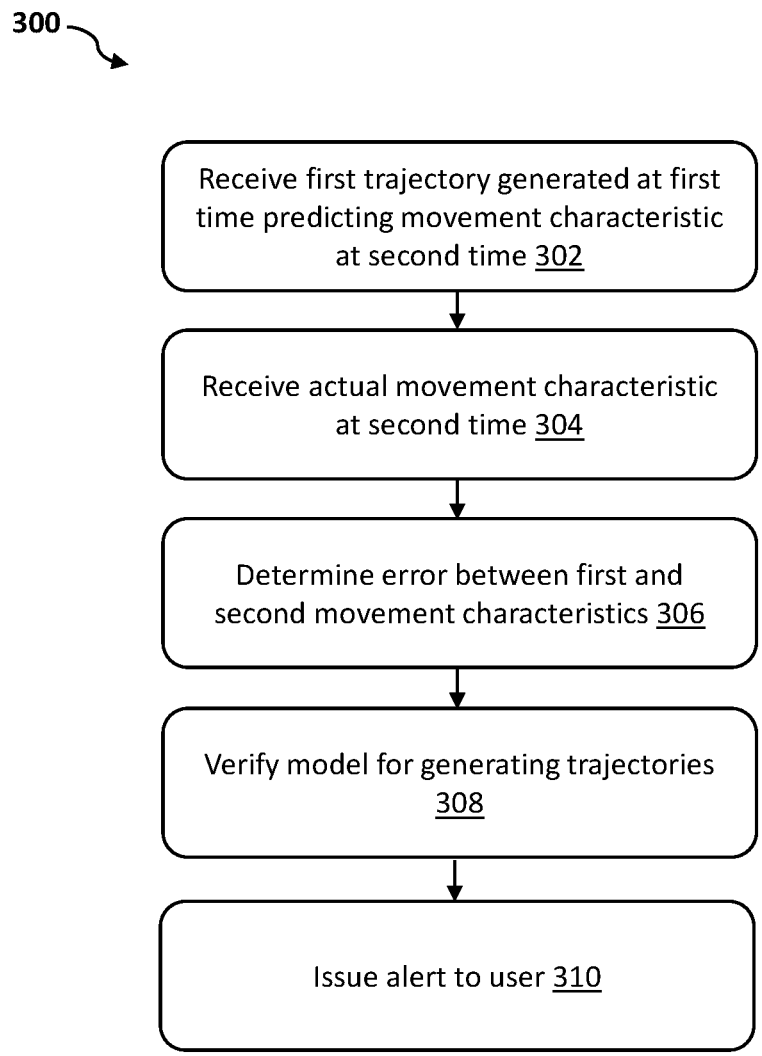

FIG. 3B illustrates an alternative example of method 300. In this example, the method may comprise the operations 302-308 discussed above. This example may further comprise operation 310, comprising issuing an alert to a user based at least in part on verifying the model. For example, if the first error/first metric meets a notification condition (e.g. exceeding a predetermined threshold), an alert or notification may be issued. The alert may identify one or more driving scenarios associated with errors causing the alert. Such techniques may highlight driving scenarios where the model performs poorly, providing information on which modifications to the model can be based. An alert may be issued if performance of the model has decreased compared to a previous time, for example if the error/metric is worse than a previously determined value. Such techniques may provide for continuous, regular, or semi-regular monitoring of the model in a vehicle or fleet of vehicles. If model performance degrades, for example because of changes in other systems of the vehicle, a user or engineer for the model may be notified. Issuing an alert or notification may comprise sending a message, email, and/or displaying a notification on a user device. In various examples, such an error may be used to prevent a proposed version of software from being released to a fleet of vehicles, causing a current version associated with a fleet of vehicles to be reverted to a previous version meeting the threshold requirements, and the like.

Figure 3C:
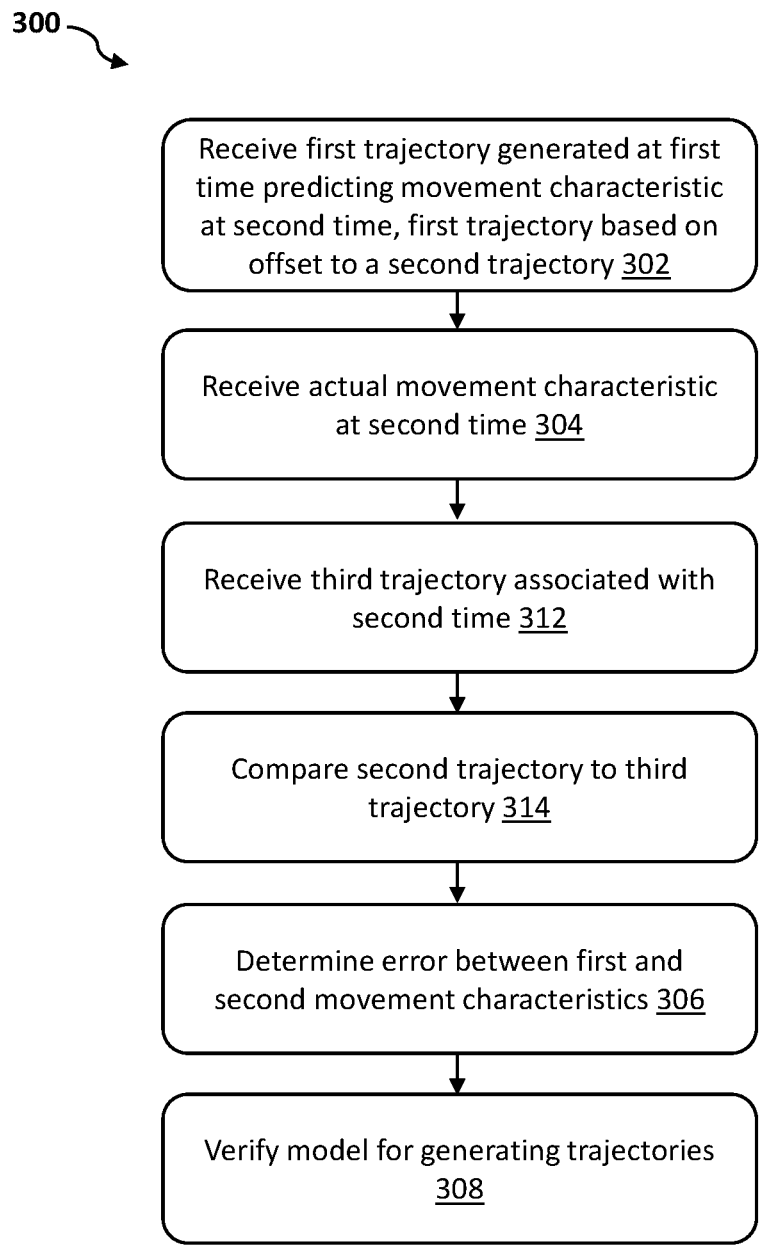

FIG. 3C illustrates a further alternative example of method 300. This example may comprise operations 302 and 304, similarly to the examples described above.

In this example, method 300 may further comprise operation 312 of receiving a third trajectory. The third trajectory may be associated with the second time. The third trajectory may be a reference trajectory of the vehicle at the second time. In other words, the third trajectory may represent the path the vehicle is being instructed to follow at the second time.

This example of method 300 may further comprise operation 314 of comparing the second trajectory to the third trajectory. For example, an intended position of the vehicle at the second time (or any other time) in the second trajectory may be compared to a corresponding position in the third trajectory. Such techniques may allow changes in the reference trajectory between the first time and second time to be identified. If the reference trajectory has changed significantly, the first (tracker) trajectory may no longer be a valid prediction of the position of the vehicle. Any error determined based on such a first trajectory may appear to show poor performance of the model and may wrongly highlight the model for improvement. For example, the first (tracker) trajectory may assume the vehicle will continue in a current lane of travel. If, after generation of the first trajectory, the reference trajectory changes to instruct the vehicle to change lanes, the actual position of the vehicle at the second time may be in a different lane to that predicted by the first tracker trajectory. Such a difference may generate a large error in operation 306, but such an error would not be a fair representation of the predictive ability of the model. Accordingly, in some examples, a difference between the second trajectory and third trajectory may be determined. For example the difference may represent a distance (e.g. lateral and/or longitudinal,) between the intended position of the vehicle at the second time in the second trajectory and the intended position of the vehicle at the second time in the third trajectory. The difference may represent a change in velocity, acceleration, heading, and/or pose. The difference may be compared to a predetermined threshold. If the difference exceeds this threshold, some examples may omit performing operations 306 and 308 using the first trajectory. In other words, no error is generated from the first trajectory, at least for the prediction time represented by the difference between the first time and second time. In such cases, another first trajectory may be selected and used to determine an error and verify the model. However, if the difference is less than the threshold, the method may proceed to operations 306, 308, and optionally 310 using the original first trajectory, as discussed above in relation to FIG. 3A or 3B. In at least some examples, such a difference may be used, for example, to scale the error determined such that larger differences are associated with smaller errors.

FIG. 4 is a block diagram of an example system 400 for implementing the techniques described herein. In at least one example, the system 400 can include a vehicle 402. In the illustrated example system 400, the vehicle 402 can be an autonomous vehicle; however, the vehicle 402 can be any other type of vehicle. In some examples, the vehicle 402 may be utilized to implement the vehicle 106, as discussed above with reference to FIG. 1.

The vehicle 402 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more first computing devices 404, one or more sensor systems 406, one or more emitters 408, one or more communication connections 410 (also referred to as communication devices and/or modems), at least one direct connection 412 (e.g., for physically coupling with the vehicle 402 to exchange data and/or to provide power), and one or more drive systems 414. By way of example, the first computing device(s) 404 may be considered to be a primary system. In some examples, the first computing device(s) 404 may be utilized to implement the primary computing device 202, as discussed above with reference to FIG. 1 and FIG. 2. The one or more sensor systems 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the first computing device(s) 404.

The vehicle 402 can also include emitter(s) 408 for emitting light and/or sound. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include communication connection(s) 410 that enable communication between the vehicle 402 and one or more other local or remote computing device(s) (e.g., a remote teleoperation computing device) or remote services. For instance, the communication connection(s) 410 can facilitate communication with other local computing device(s) on the vehicle 402 and/or the drive system(s) 414. Also, the communication connection(s) 410 can allow the vehicle 402 to communicate with other nearby computing device(s) (e.g., other nearby vehicles, traffic signals, etc.). The communication connections 410 may be used to transmit the first error, or first tracker trajectory and corresponding actual position at the second time, to a remote computing device as discussed above in relation to FIGS. 1 and 3.

The communications connection(s) 410 can include physical and/or logical interfaces for connecting the first computing device(s) 404 to another computing device or one or more external networks 416 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 402 can include drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include the sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s). In some examples, the drive system(s) 414 may be utilized to implement control signals determined based on the tracker trajectory, as discussed above in relation to FIG. 1.

The vehicle 402 can include one or more second computing devices 418 to provide redundancy, error checking, and/or validation of determinations and/or commands determined by the first computing device(s) 404. By way of example, while the first computing device(s) 404 may be considered to be the primary system, the second computing device(s) 418 may be considered to be a secondary system. In some examples, the second computing device(s) 418 may be utilized to implement the secondary computing device 304, as discussed above with reference to FIG. 2.

The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference and for all purposes.

The first computing device(s) 404 can include one or more processors 420 and memory 422 communicatively coupled with the one or more processors 420. In the illustrated example, the memory 422 of the first computing device(s) 404 stores a localization component 424, a perception component 426, a prediction component 428, a planning component 430, a maps component 432, and one or more system controllers 434. Though depicted as residing in the memory 422 for illustrative purposes, it is contemplated that the localization component 424, the perception component 426, the prediction component 428, the planning component 430, the maps component 432, and the one or more system controllers 434 can additionally, or alternatively, be accessible to the first computing device(s) 404 (e.g., stored in a different component of vehicle 402 and/or be accessible to the vehicle 402 (e.g., stored remotely).

The localization component 424 can include functionality to receive data from the sensor system(s) 406 to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory, as discussed herein.

The perception component 426 can include functionality to perform object detection, segmentation, and/or classification. In some examples, the perception component 426 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional or alternative examples, the perception component 426 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 426 can use perception algorithms to determine a perception-based bounding box associated with an object in the environment based on sensor data and/or a predicted trajectory associated with such an object. For example, the perception component 426 can receive image data and classify the image data to determine that an object is represented in the image data. Then, using detection algorithms, the perception component 426 can generate a two-dimensional bounding box and/or a perception-based three-dimensional bounding box associated with the object. The perception component 426 can further generate a three-dimensional bounding box associated with the object. As discussed above, the three-dimensional bounding box can provide additional information such as a location, orientation, pose, and/or size (e.g., length, width, height, etc.) associated with the object.

The perception component 426 can include functionality to store perception data generated by the perception component 426. In some instances, the perception component 426 can determine a track corresponding to an object that has been classified as an object type. For purposes of illustration only, the perception component 426, using sensor system(s) 406 can capture one or more images of an environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 402. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 428 can generate one or more probability maps representing prediction probabilities of possible locations of one or more objects in an environment. For example, the prediction component 428 can generate one or more probability maps for vehicles, pedestrians, animals, and the like within a threshold distance from the vehicle 402. In some instances, the prediction component 428 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 430 can determine a path for the vehicle 402 to follow to traverse through an environment. For example, the planning component 430 can determine various routes and paths and various levels of detail. In some instances, the planning component 430 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 430 can generate an instruction for guiding the autonomous vehicle along at least a portion of the route from the first location to the second location. In some examples, the planning component 430 may be utilized to implement the planning component 206, as discussed above with reference to FIG. 2, or generally to generate reference trajectories for use in the methods discussed herein.

In at least one example, the planning component 430 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 430 can alternatively, or additionally, use data from the perception component 426 and/or the prediction component 428 to determine a path for the vehicle 402 to follow to traverse through an environment. For example, the planning component 430 can receive data from the perception component 426 and/or the prediction component 428 regarding objects associated with an environment. Using this data, the planning component 430 can determine a route to travel from a first location (e.g., a current location) to a second location (e.g., a target location) to avoid objects in an environment. In at least some examples, such a planning component 430 may determine there is no such collision free path and, in turn, provide a path which brings vehicle 402 to a safe stop avoiding all collisions and/or otherwise mitigating damage.

The memory 422 can further include one or more maps 432 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 432 can include at least one map (e.g., images and/or a mesh). In some examples, the vehicle 402 can be controlled based at least in part on the map(s) 432. That is, the map(s) 432 can be used in connection with the localization component 424, the perception component 426, the prediction component 428, and/or the planning component 430 to determine a location of the vehicle 402, identify objects in an environment, generate prediction probabilit(ies) associated with objects and/or the vehicle 402, and/or generate routes and/or trajectories to navigate within an environment.

In some examples, the one or more maps 432 can be stored on a remote computing device(s) (such as the computing device(s) 452) accessible via network(s) 416. In some examples, multiple maps 432 can be stored based on, for example, a characteristic (e.g., type of entity, time of day, day of week, season of the year, etc.). Storing multiple maps 432 can have similar memory requirements but can increase the speed at which data in a map can be accessed.

In at least one example, the first computing device(s) 404 can include one or more system controller(s) 434, which can be configured to control steering, propulsion, braking, safety, emitters, communication, and other systems of the vehicle 402. These system controller(s) 434 can communicate with and/or control corresponding systems of the drive system(s) 414 and/or other components of the vehicle 402, which may be configured to operate in accordance with a path provided from the planning component 430.

The second computing device(s) 418 can comprise one or more processors 436 and memory 438 including components to verify and/or control aspects of the vehicle 402, as discussed herein. In at least one instance, the one or more processors 436 can be similar to the processor(s) 420 and the memory 438 can be similar to the memory 422. However, in some examples, the processor(s) 436 and the memory 438 may comprise different hardware than the processor(s) 420 and the memory 422 for additional redundancy. In some examples, the memory 438 can comprise a localization component 440, a perception/prediction component 442, one or more system controllers 444, and a planning component 446. In some examples the second computing device(s) 418 may comprise an error determination component, as discussed above in relation to FIG. 2. In other examples, second computing device(s) 418 may otherwise be configured generate tracker trajectories and optionally corresponding errors, as discussed above in relation to any of the techniques of this disclosure.

In some examples, the localization component 440 may receive sensor data from the sensor(s) 406 to determine one or more of a position and/or orientation (together a pose) of the autonomous vehicle 402. Here, the position and/or orientation may be relative to point(s) and/or object(s) in an environment in which the autonomous vehicle 402 is located. In examples, the orientation may include an indication of a yaw, roll, and/or pitch of the autonomous vehicle 402 relative to a reference plane and/or relative to point(s) and/or object(s). In examples, the localization component 440 may perform less processing than the localization component 424 of the first computing device(s) 404 (e.g., higher-level localization). For instance, the localization component 440 may not determine a pose of the autonomous vehicle 402 relative to a map, but merely determine a pose of the autonomous vehicle 402 relative to objects and/or surfaces that are detected around the autonomous vehicle 402 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data. In some examples, the localization component 440 can be omitted and localization information can be determined by the first computing device 404 and provided to the second computing device 418.

In some examples, the perception/prediction component 442 can include functionality to detect, identify, classify, and/or track object(s) represented in sensor data. For example, the perception/prediction component 442 can perform the clustering operations and operations to estimate or determine a height associated with objects, as discussed herein. In some examples, the perception/prediction component 442 may comprise an M-estimator, but may lack an object classifier such as, for example, a neural network, decision tree, and/or the like for classifying objects. In additional or alternate examples, the perception/prediction component 442 may comprise an ML model of any type, configured to disambiguate classifications of objects. By contrast, the perception component 426 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 442 (and/or 426) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 442 may also process the input data to determine one or more predicted trajectories for an object. For example, based on a current position of an object and a velocity of the object over a period of a few seconds, the perception/prediction component 442 may predict a path that the object will move over the next few seconds. In some examples, such a predicted path may comprise using linear assumptions of motion given a position, orientation, velocity, and/or orientation. In other examples, such predicted paths may comprise more complex analyses. Additional examples of detecting objects and determining predicted object trajectories can be found, for example, in U.S. patent application Ser. No. 17/514,542 titled "Collision Avoidance and Mitigation in Autonomous Vehicles" and filed Oct. 29, 2021, the entirety of which is herein incorporated by reference and for all purposes. Additional examples of detecting object classifications for trajectory validation can be found, for example, in U.S. patent application Ser. No. 16/588,717 titled "Complex Ground Profile Estimation" and filed Sep. 30, 2019, the entirety of which is herein incorporated by reference. Additional examples of determining perception information utilized for trajectory selection can be found, for example, in U.S. patent application Ser. No. 17/116,888 titled "Perception System Velocity Determination" and filed Dec. 9, 2020, the entirety of which is herein incorporated by reference and for all purposes.

In some examples, the system controller(s) 444 can include functionality to control safety critical components (e.g., steering, braking, motors, etc.) of the vehicle. In this manner, the second computing device(s) 418 can provide redundancy and/or an additional hardware and software layer for vehicle safety. In some examples, the system controller(s) 444 may be utilized to implement collision avoidance controls, as discussed above with reference to FIG. 1. In some examples, the planning component 446 can include a predicted driving trajectory component 448 and a collision checking component 450. In some examples, the predicated driving trajectory component 448 can be utilized to implement the predicted driving trajectory component 208. In those or other examples, the collision checking component 450 can be utilized to implement collision checking. By way of example, the predicted driving trajectory component 448 can receive, from the planning component 430, the reference trajectory (e.g., the reference trajectory 108) as described in detail above. The predicted driving trajectory component 448 can utilize the reference trajectory to generate a tracker trajectory (e.g., the tracker trajectory 202). The collision checking component 450 can perform collision checking utilizing the tracker trajectory to validate the reference trajectory. The collision checking component 450 can output, to the drive system(s) 414, a command trajectory based on validation of the reference trajectory.

The vehicle 402 can connect to computing device(s) 452 via the network 416 and can include one or more processors 454 and memory 456 communicatively coupled with the one or more processors 454. In at least one instance, the one or more processors 454 can be similar to the processor(s) 420 and the memory 456 can be similar to the memory 422. In the illustrated example, the memory 456 of the computing device(s) 452 stores a component(s) 458, which may correspond to any of the components discussed herein.

The processor(s) 420, 436, and/or 454 can be any suitable processor capable of executing instructions to process data and perform operations as described herein. By way of example and not limitation, the processor(s) 420, 436, and/or 454 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions. The memory 422, 438, and/or 456 are examples of non-transitory computer-readable media. The memory 422, 438, and/or 456 can store an operating system and one or more software applications, instructions, programs, and/or data to implement the methods described herein and the functions attributed to the various systems. In various implementations, the memory 422, 438, and/or 456 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 422, 438, and/or 456 can be implemented as a neural network. In some examples, the components in the memory 422, 438, and/or 456 may not include machine learning algorithm to reduce complexity and to be verified and/or certified from a safety standpoint.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Figure 5:
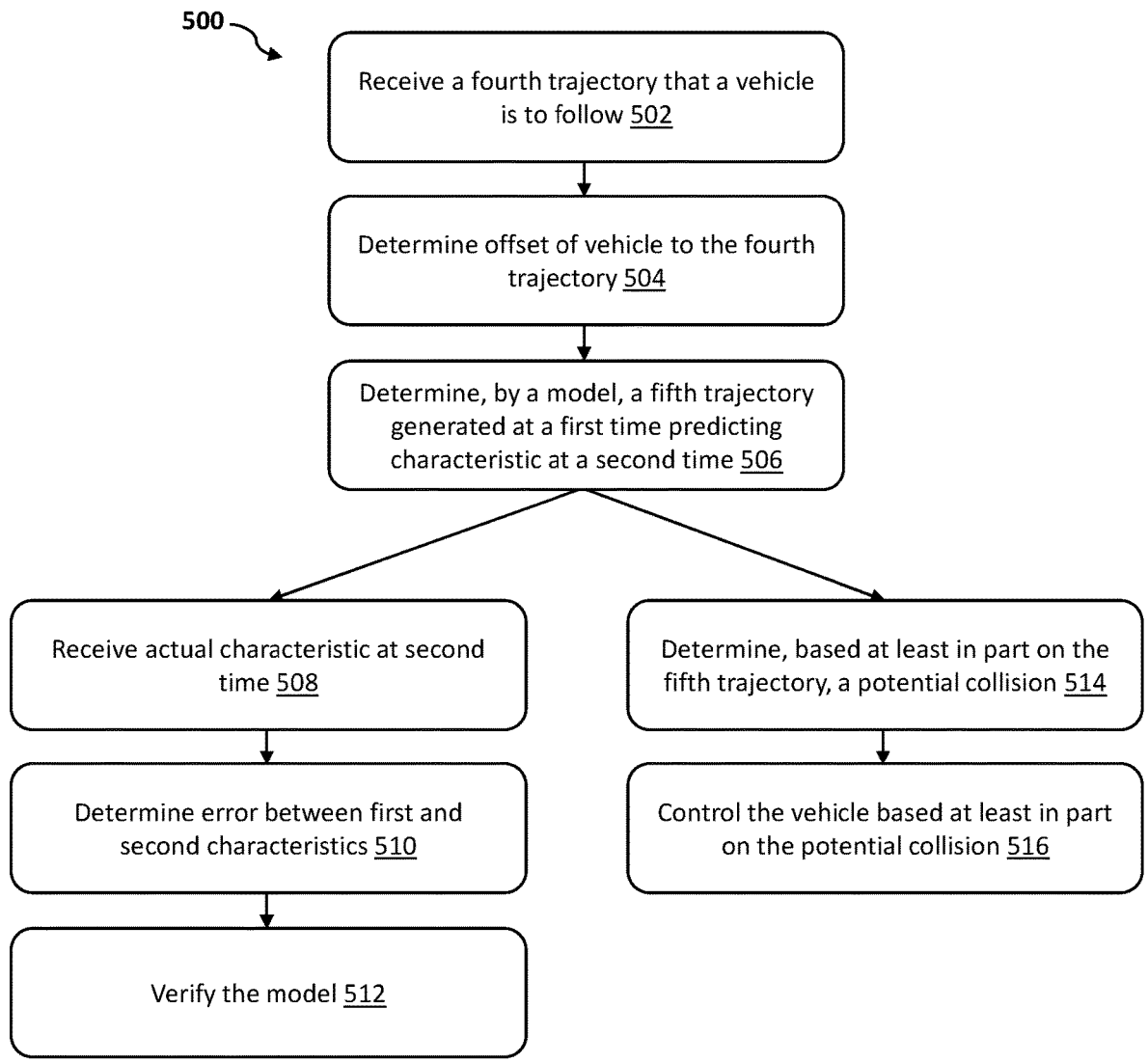
FIG. 5 depicts an example process for implementing techniques described herein.

FIG. 5 illustrates an example method 500. Method 500 may start at operation 502. Operation 502 may comprise receiving a fourth trajectory that a vehicle is to follow. The fourth trajectory may be a reference trajectory. The fourth trajectory may represent an optimized or nominal trajectory for the vehicle to traverse an environment.

Method 500 may comprise operation 504. At operation 504, an offset of the vehicle to the fourth trajectory may be determined. The offset may be a lateral, longitudinal, heading etc. offset as discussed above in relation to FIG. 1.

Method 500 may comprise operation 506. Operation 506 may comprise determining, by a model, a fifth trajectory based at least in part on the offset. The fifth trajectory may be a tracker trajectory. The fifth trajectory may be generated at a first time. The first trajectory may predict a first characteristic of the vehicle at a second time. The model may be a model configured to verify a trajectory for the vehicle and/or to provide collision avoidance. The model may be implemented on a secondary computing device, as discussed above in relation to FIG. 1.

The method 500 may optionally comprise operations 508-512. Operation 508 may comprise receiving a second characteristic of the vehicle. The second characteristic may represent an actual movement characteristic of the vehicle at the second time. Operation 510 may comprise determining an error between the first characteristic and the second characteristic. Operation 512 may comprise verifying, based at least in part on the error, performance of the model. Operations 508-512 may be the same or substantially the same as operations 304-308 of method 300, discussed above. Any examples described in relation to method 300 may apply equally to method 500. The method 500 may further comprise operation 310 and/or operations 312-314 discussed above in relation to method 300.

Alternatively or additionally to operations 508-512, method 500 may comprise operations 514-516. Operation 514 may comprise determining, based at least in part on the fifth trajectory, a potential collision. For example, operation 514 may comprise detecting an object in sensor data. The sensor data may be data measured or received by the vehicle. The sensor data may comprise or may be derived from data recorded by one or more sensors of the vehicle. The sensor data may be generated by a perception component of the vehicle. In some examples, the sensor data may comprise a representation of an object in the environment, such as a bounding box. In some examples, operation 514 may further comprise propagating a model or representation of the vehicle along the second trajectory, and/or propagating a model or representation of the object along an object trajectory. The object trajectory may represent a path the object is predicted to follow. The object trajectory may be determined by a prediction component, for example based on one or more models. The object trajectory may represent a continuation of a path currently followed by the object, for example assuming the object maintains a constant heading, speed, and/or acceleration. Operation 514 may comprise determining whether there is an overlap between the model of the vehicle and the model of the object. For example, if may be determined if there is any overlap between respective bounding boxes representing the vehicle and the object.

Operation 516 may comprise controlling the vehicle based at least in part on the potential collision. For example, operation 516 may comprise controlling the vehicle in accordance with a contingent trajectory to avoid a potential collision, or otherwise varying operation of the vehicle to avoid the potential collision.

EXAMPLE CLAUSES

A: A system comprising one or more processors; and one or more computer-readable media storing instructions executable by the one or more processors, wherein the instructions, when executed, cause the system to perform operations comprising: receiving, from a primary computing component, a first reference trajectory for an autonomous vehicle to follow; determining an offset of the autonomous vehicle with respect to the first reference trajectory; determining, by a secondary computing component, based at least in part on the offset, a tracker trajectory that the autonomous vehicle is predicted to drive to converge to the first reference trajectory, the tracker trajectory generated at a first time and comprising a predicted position of the autonomous vehicle at a later second time; receiving an actual position of the autonomous vehicle at the second time; determining an error between the predicted position and the actual position of the autonomous vehicle at the second time; determining a likelihood of collision between the vehicle and an object proximate the vehicle based at least in part on the tracker trajectory; and controlling the autonomous vehicle based at least in part on the likelihood of collision.

B: The system according to clause A, the operations comprising: determining a difference between the first reference trajectory associated with the tracker trajectory and a second reference trajectory associated with the second time; and determining that the difference is less than or equal to a threshold difference.

C: The system according to clause A or B, wherein the error represents a lateral error between the predicted position and the actual position, a longitudinal error between the predicted position and the actual position, or a heading error between the predicted position and the actual position.

D: The system according to any of clauses A to C, the operations comprising: verifying the secondary computing component based at least in part on the error between the predicted position and the actual position of the autonomous vehicle at the second time.

E: A method comprising: receiving a first trajectory that a vehicle is to follow; determining an offset of the vehicle to the first trajectory; determining, by a model, a second trajectory based at least in part on the offset, the second trajectory generated at a first time and predicting a first characteristic of the vehicle at a second time; and one or more of: determining, based at least in part on the second trajectory, a potential collision; and controlling the vehicle based at least in part on the potential collision, or receiving a second characteristic of the vehicle representing an actual movement characteristic of the vehicle at the second time; determining an error between the first characteristic and the second characteristic; and verifying, based at least in part on the error, performance of the model.

F: The method according to clause E, wherein the first characteristic and the second comprise one or more of a position, velocity, acceleration, orientation, or pose of the vehicle at the second time.

G: The method according to clause E or F, comprising: generating a metric based at least in part on the error, the metric descriptive of performance of the model.

H: The method according to clause G, comprising: comparing the metric to a threshold; and issuing an alert to a user based on comparing the metric to the threshold.

I: The method according to any of clauses E to H, wherein determining the error is based at least in part on: receiving a third trajectory; determining a difference between the first trajectory and the third trajectory; and determining that the difference is less than or equal to a threshold difference.

J: The method according to any of clauses E to I, wherein determining the predicted collision comprises: receiving sensor data; detecting an object in sensor data; propagating a model of the vehicle along the second trajectory; propagating a model of the object along an object trajectory; and determining whether there is overlap between the model of the vehicle and the model of the object.

K: The method according to any of clauses E to J, further comprising: determining, based at least in part on the error, a geographic location associated with the error.

L: One or more non-transitory computer-readable media storing instructions executable by one or more processors, wherein the instructions, when executed, cause the one or more processors to perform operations comprising: receiving a first trajectory that a vehicle is predicted to follow, the first trajectory based at least in part on an offset between the vehicle and a second trajectory associated with the vehicle, the first trajectory generated at a first time and predicting a first movement characteristic of the vehicle at a second time; receiving a second movement characteristic of the vehicle, the second movement characteristic representing an actual movement characteristic of the vehicle at the second time; determining a first error between the first movement characteristic and the second movement characteristic; and verifying, based at least in part on the first error, performance of a model for generating trajectories that a vehicle is predicted to follow.

M: The one or more non-transitory computer-readable media according to clause L, the operations comprising: issuing an alert to a user based at least in part on verifying the model.

N: The one or more non-transitory computer-readable media according to clause L or clause M, the operations comprising: determining a metric based at least in part on the first error and on a second error, the second error determined based at least in part on a third characteristic of the vehicle at a third time predicted by a third trajectory.

O: The one or more non-transitory computer-readable media according to any of clauses L to N, the operations comprising: comparing the first error to a third error, the third error determined based at least in part on a fourth characteristic of the vehicle at a fourth time predicted by a fourth trajectory.

P: The one or more non-transitory computer-readable media according to any of clauses L to N, the operations comprising: determining the first trajectory based at least in part on the offset between the vehicle and the second trajectory.

Q: The one or more non-transitory computer-readable media according to any of clauses L to P, the operations comprising: comparing the second trajectory to a third trajectory associated with the vehicle, the third trajectory associated with the second time.

R: The one or more non-transitory computer-readable media according to any of clauses L to Q, wherein the second trajectory represents a reference trajectory for the vehicle to follow, and wherein the first trajectory represents a trajectory the vehicle is predicted to drive to converge to the second trajectory.

S: The one or more non-transitory computer-readable media according to any of clauses L to R, the operations comprising: transmitting the first error to a remote computing device.

T: The one or more non-transitory computer-readable media according to any of clauses L to S, wherein the first error represents one or more of a position error, a lateral position error, a longitudinal position error, a heading error, a pose error, a velocity error, or an acceleration error.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more computer-readable media storing instructions executable by the one or more processors, wherein the instructions, when executed, cause the system to perform operations comprising:
receiving, from a primary computing component, a first reference trajectory for an autonomous vehicle to follow;
determining an offset of the autonomous vehicle with respect to the first reference trajectory;
determining, by a secondary computing component, based at least in part on the offset, a tracker trajectory that the autonomous vehicle is predicted to be controlled to drive to converge to the first reference trajectory, the tracker trajectory generated at a first time and comprising a predicted position of the autonomous vehicle at a later second time;
receiving an actual position of the autonomous vehicle at the second time;
determining an error between the predicted position and the actual position of the autonomous vehicle at the second time;
determining a likelihood of collision between the vehicle and an object proximate the vehicle based at least in part on the tracker trajectory; and
controlling the autonomous vehicle based at least in part on the likelihood of collision.

2. The system of claim 1, the operations comprising:
determining a difference between the first reference trajectory associated with the tracker trajectory and a second reference trajectory associated with the second time; and
determining that the difference is less than or equal to a threshold difference.

3. The system of claim 1, wherein the error represents a lateral error between the predicted position and the actual position, a longitudinal error between the predicted position and the actual position, or a heading error between the predicted position and the actual position.

4. The system of claim 1, the operations comprising:
verifying the secondary computing component based at least in part on the error between the predicted position and the actual position of the autonomous vehicle at the second time.

5. A method comprising:
receiving a first trajectory that a vehicle is to follow;
determining an offset of the vehicle to the first trajectory;
determining, by a model, a second trajectory based at least in part on the offset, the second trajectory generated at a first time and predicting a first characteristic of the vehicle at a second time, the second trajectory representing a prediction of a path the vehicle will be controlled to follow to converge to the first trajectory; and
one or more of:
determining, based at least in part on the second trajectory, a potential collision; and
controlling the vehicle based at least in part on the potential collision, or
receiving a second characteristic of the vehicle representing an actual movement characteristic of the vehicle at the second time;
determining an error between the first characteristic and the second characteristic; and
verifying, based at least in part on the error, performance of the model.

6. The method of claim 5, wherein the first characteristic and the second characteristic comprise one or more of a position, velocity, acceleration, orientation, or pose of the vehicle at the second time.

7. The method of claim 5, comprising:
generating a metric based at least in part on the error, the metric descriptive of performance of the model.

8. The method of claim 7, comprising:
comparing the metric to a threshold; and
issuing an alert to a user based on comparing the metric to the threshold.

9. The method of claim 5, wherein determining the error is based at least in part on:
receiving a third trajectory;
determining a difference between the first trajectory and the third trajectory; and
determining that the difference is less than or equal to a threshold difference.

10. The method of claim 5, wherein determining the potential collision comprises:
receiving sensor data;
detecting an object in sensor data;
propagating a model of the vehicle along the second trajectory;
propagating a model of the object along an object trajectory; and
determining whether there is overlap between the model of the vehicle and the model of the object.

11. The method of claim 5, further comprising:
determining, based at least in part on the error, a geographic location associated with the error.

12. One or more non-transitory computer-readable media storing instructions executable by one or more processors, wherein the instructions, when executed, cause the one or more processors to perform operations comprising:
receiving a first trajectory that a vehicle is predicted to follow, the first trajectory based at least in part on an offset between the vehicle and a second trajectory associated with the vehicle, the first trajectory generated at a first time and predicting a first movement characteristic of the vehicle at a second time, the first trajectory representing a prediction of a path the vehicle will be controlled to follow based on the offset;
receiving a second movement characteristic of the vehicle, the second movement characteristic representing an actual movement characteristic of the vehicle at the second time;
determining a first error between the first movement characteristic and the second movement characteristic; and verifying, based at least in part on the first error, performance of a model for generating trajectories that a vehicle is predicted to follow.

13. The one or more non-transitory computer-readable media of claim 12, the operations comprising:

issuing an alert to a user based at least in part on verifying the model.

14. The one or more non-transitory computer-readable media of claim 12, the operations comprising:

determining a metric based at least in part on the first error and on a second error, the second error determined based at least in part on a third characteristic of the vehicle at a third time predicted by a third trajectory.

15. The one or more non-transitory computer-readable media of claim 12, the operations comprising:

comparing the first error to a third error, the third error determined based at least in part on a fourth characteristic of the vehicle at a fourth time predicted by a fourth trajectory.

16. The one or more non-transitory computer-readable media of claim 12, the operations comprising:

determining the first trajectory based at least in part on the offset between the vehicle and the second trajectory.

17. The one or more non-transitory computer-readable media of claim 12, the operations comprising:

comparing the second trajectory to a third trajectory associated with the vehicle, the third trajectory associated with the second time.

18. The one or more non-transitory computer-readable media of claim 12, wherein the second trajectory represents a reference trajectory for the vehicle to follow, and wherein the first trajectory represents a trajectory the vehicle is predicted to drive to converge to the second trajectory.

19. The one or more non-transitory computer-readable media of claim 12, the operations comprising:

transmitting the first error to a remote computing device.

20. The one or more non-transitory computer-readable media of claim 12, wherein the first error represents one or more of a position error, a lateral position error, a longitudinal position error, a heading error, a pose error, a velocity error, or an acceleration error.

* * * * *